United States Patent
Orlik et al.

(10) Patent No.: US 7,414,977 B2
(45) Date of Patent: Aug. 19, 2008

(54) POWER AND DELAY SENSITIVE AD-HOC COMMUNICATION NETWORKS

(75) Inventors: Philip Orlik, Cambridge, MA (US);
Zafer Sahinoglu, Somerville, MA (US);
Jinyun Zhang, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 912 days.

(21) Appl. No.: 10/722,031

(22) Filed: Nov. 25, 2003

(65) Prior Publication Data

US 2005/0111428 A1    May 26, 2005

(51) Int. Cl.
G08C 17/00 (2006.01)
(52) U.S. Cl. .................................................. 370/238
(58) Field of Classification Search ................ 370/238, 370/318, 311
See application file for complete search history.

(56) References Cited

U.S. PATENT DOCUMENTS

| | | | | |
|---|---|---|---|---|
| 6,961,310 B2 * | 11/2005 | Cain | ........................ | 370/238 |
| 7,151,769 B2 * | 12/2006 | Stanforth et al. | ............ | 370/351 |
| 2005/0041591 A1 * | 2/2005 | Duggi et al. | ................ | 370/238 |

OTHER PUBLICATIONS

Josh Brock, David B Johnson, David A. Maltz, "The Dynamic Source Routing Protocol for Mobile Ad Hoc Networks", <draft-ietf-manet-dsr-00.txt>, IETF Manet Working Group, Mar. 1998.*
Heinzelman et al., in "*Energy-efficient Communication Protocol for Wireless Micro-sensor Networks,*" Proc. of the IEEE Hawaii Int. Conf. on System Sciences, pp. 3005-3014, Jan. 2000.
Chang et al, in "*Energy Conserving Routing in Wireless Ad-hoc Networks,*" Proc. of IEEE Infocom 2000, Mar. 2000.

* cited by examiner

*Primary Examiner*—Chau Nguyen
*Assistant Examiner*—Suk Jin Kang
(74) *Attorney, Agent, or Firm*—Dirk Brinkman; Clifton D. Mueller; Gene V. Vinokur

(57) ABSTRACT

An ad-hoc wireless communication network includes multiple nodes. Each node maintains a routing table. The routing table is constructed by broadcasting route request packets from a source node. The request packet includes an address of a destination node. Intermediate nodes in the network receiving the request packet, determine power and delay cost associated with the intermediate node participating in the route. If the cost is less than a threshold value, then the intermediate node participates in the routing of packets for other nodes. The intermediate node then sends a reply packet back to the source node. The reply packet includes the intermediate node addresses, as well as the power and delay costs. The source can thus construct the routing table. The source node can select a particular node for transferring application data packets based on either the power cost, the delay cost or both costs.

13 Claims, 4 Drawing Sheets

POWER AND DELAY SENSITIVE AD-HOC COMMUNICATION NETWORKS

FIELD OF THE INVENTION

This invention relates generally to the field of wireless communications networks, and more particularly to routing in ad-hoc communications networks.

BACKGROUND OF THE INVENTION

In an ad hoc wireless network, transceivers or "nodes" are arranged to communicate with each other without any network infrastructure or centralized administration. The arrangement can be static or dynamic, or combinations thereof. The nodes can be cellular telephones, portable computing devices, or special purpose devices such as sensors. The nodes in the network establish routing among themselves to form their own network. Due to a limited transmission range of the transceivers, messages from a source node may have to pass through one or more intermediate routing nodes before reaching a destination node.

In many ad hoc wireless networks, most, if not all of the nodes are battery powered. Therefore, minimizing power consumption is a primary concern because nodes become disabled when they deplete the power stored in their batteries. The loss of a node is a serious problem. First, the node cannot perform its assigned task. Second, the node can no longer act as a router for other nodes. Thus, the loss of a node can partition the network. Therefore, it is desired to prolong the life of battery operated nodes in a network.

Some techniques for reducing power decrease transcoder complexities, use low power circuits and low signaling-cost routing protocols. Other techniques attempt to exploit the network topology to reduce power.

Heinzelman et al., in "*Energy-efficient Communication Protocol for Wireless Micro-sensor Networks*," Proc. of the IEEE Hawaii Int. Conf. on System Sciences, pp. 3005-3014, January, 2000, describe communication protocols for power reduction in a wireless network. They describe a clustering based protocol that utilizes randomized rotation of local cluster heads to evenly distribute the power load among the nodes in the network. They also indicate that when the distance between two nodes is short, direct transmission is more efficient than multiple hop transmission.

Chang et al, in "*Energy Conserving Routing in Wireless Ad-hoc Networks*," Proc. of IEEE INFOCOM 2000, March, 2000, describe methods for selecting routes and corresponding power levels in a static wireless network so that power consumption is reduced.

Catovic et al, in "*A new approach to minimum energy routing for next generation multi-hop wireless networks*," Journal of Communications and Networks, Special Issue on "*Evolving from 3G deployment to 4G definition*," December 2002, describe a technique for transmitting data over two different channels at different power levels. A rake receiver is used to reconstruct the original data by combining the two received signals.

Chen et al., "*Energy Efficient System Design with Optimum Transmission Range for Wireless Ad-hoc Networks*," Proc of IEEE Int. Conf. on Communications, ICC'02, pp. 945-952, May, 2002, determine optimum transmission range and hop distances in wireless ad-hoc networks.

In many wireless networks, information is exchanged with packets. When nodes are within radio range, the nodes communicate directly with each other, otherwise the nodes communication indirectly by a series of wireless 'hops' or links through other intermediate nodes. The end-to-end links between a source node and a destination node are known as a route.

Therefore, it is necessary for nodes to locate neighboring nodes that are within radio range, and to determine routes to other nodes. For time sensitive data, e.g., sensor data, or for streaming data, e.g., audio or video streams, it is necessary to find a route with a minimum amount of delay. For battery-powered networks, it is also necessary to find routes that include nodes with sufficient power reserves.

In some ad-hoc networks, the nodes can be mobile while exchanging data. Therefore, the routing information needs to be updated dynamically and on-demand. It is desired to do this while minimizing traffic, minimizing the computational load, minimizing memory requirements, and minimizing power consumption.

In the prior art, two techniques have been used to address the above problems: dynamic source routing (DSR), and ad-hoc on-demand distance vector routing (AODV).

DSR is 'on-demand'. DSR allows a source node to discover dynamically a route, via multiple network links, to any destination node in the ad-hoc network. DSR is also 'loop-free' because each packet includes a complete, ordered list of addresses of nodes that form the route.

DSR operates in two modes: route discovery, and route maintenance. During route discovery, the source node discovers and determines an ordered list of nodes through which packets must pass while traveling to the destination node. This ordered list is appended to each packet that is transmitted in the network. In that way, an intermediate node merely forwards a received packet to the next node in the ordered list. Thus, intermediate nodes do not need to discover and maintain routing information for all nodes in the network. However, the intermediate node can store the routing information contained in forwarded packets in a memory for future use.

AODV is also on-demand and supports multicast. However, in this case, each node in the network maintains a routing table. Therefore, the memory requirements are potentially higher for this technique than for DSR. For local connectivity, each node sends periodic 'hello' packets to neighboring nodes. AODV invalidates idle routes after a predetermined amount. In high mobility environments, AODV has less delay than DSR. However, because the overhead associated with the hello packets in AODV is high, the throughput of AODV is less than DSR.

SUMMARY OF THE INVENTION

The invention provides a method for determining routes in a network based on maximizing a residual power in the network. That is, the total available power in all intermediate nodes along the route from a source node to a destination node is a maximum. Other cost metrics such end-to-end delay, the number of links, reliability or shortest route can also be considered. The method can also determine multiple routes between a source node and a destination node.

The header of each packet transmitted from a source node S to a destination node D carries an ordered list of addresses of intermediate nodes along the route. The header also carries information used by a cost function for route selection, for example, the amount of residual power in each node.

When an intermediate node receives the packet, the intermediate node locates its own address in the list and forwards the packet to the next node in the list and updates the header information.

Routes can be determined on-demand. In this mode, only 'active' routes are maintained. The maintenance occurs as packets are forwarded along the route from the source node to the destination node.

While forwarding the packet, an intermediate node can update its power and delay costs in the packet header. The destination node acknowledges each packet, and this acknowledgement contains any updated cost information. When acknowledgement of a packet is not received, the source node can select an alternative route from its routing table, or discover a new route.

Route discovery can also be initiated in response to a notification from a network coordinator node.

More particularly, an ad-hoc wireless communication network includes multiple nodes. Each node maintains a routing table. The routing table is constructed by broadcasting a route request packet in the source node. The request packet includes an address of the destination node.

Intermediate nodes in the network receiving the request packet, determine power and delay cost associated with the intermediate node participating in the route. If the cost is less than a threshold value, then the intermediate node participates in forming the route.

If an intermediate node already has a route to the destination node, then the intermediate node can send a reply packet back to the source node informing the source of the route to the destination. The reply packet includes the intermediate node addresses, as well as the power and delay costs. The source node can thus construct the routing table. If the intermediate node does not have a route to the destination node, then the intermediate node rebroadcast the request packet after updating the cost fields. This is repeated until the route has been determined.

The source node can select a particular route transferring packets based on the power cost and possible other cost factors such as delay incurred on the route.

DETAILED DESCRIPTION OF THE PREFERRED EMBODIMENT

Network Structure

Figure 1:
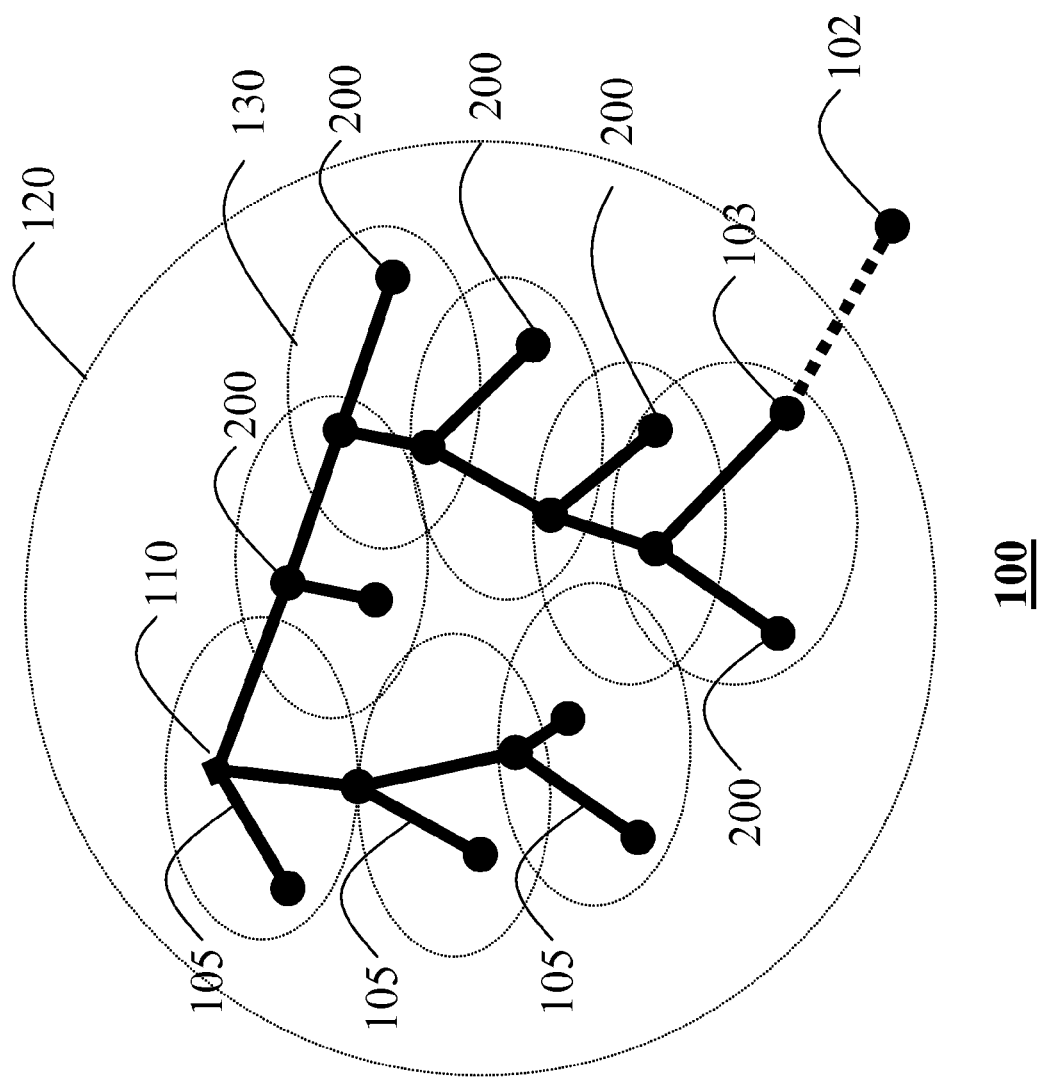
FIG. 1 is a block diagram of a wireless communication network according to the invention.

FIG. 1 shows a network 100 that uses the invention. The network can combine ad-hoc, star and peer-to-peer topologies. Nodes 200 communicate with each other via wireless links 105. Multiple links form routes. The network is self-organizing, and there can be one coordinator node 110 that provides synchronization services to the nodes in the network and to other coordinator nodes. The coordinator node can have a pre-assigned address known to all nodes.

During network formation, all nodes within a radio sphere 120 of the coordinator node associate themselves with the coordinator node. A node 102 out of the radio sphere 120 associates with the coordinator node 110 via a boundary node 103, thereby extending its communication range to access other nodes associated with the network. Nodes within each other's radio sphere constitute a cluster 130. A group of clusters makes up the entire network 100.

Network Node

Figure 2:
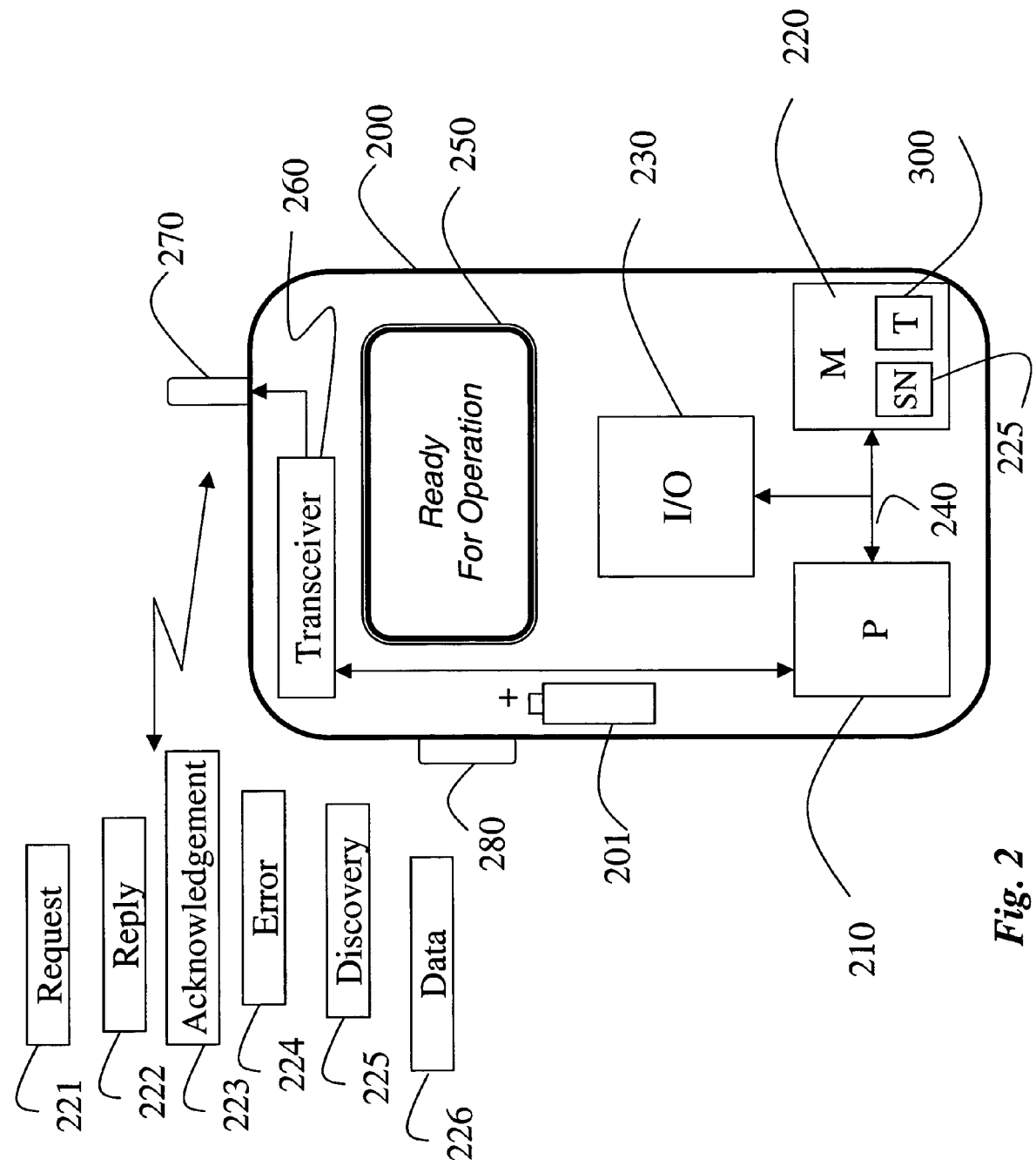
FIG. 2 is a block diagram of a node in the network of FIG. 1.

As shown in FIG. 2, each node includes a processor (P) 210, a memory (M) 220, and an I/O interface 230 connected by busses 240. The node also includes a transceiver 260 and an antenna 270 for wireless radio communications. The node can also include a display 250, and user control keys or switches 280. The preferred nodes are operated by a battery 201. It is desired to maximize the total residual power for all nodes in the network over time.

The processor 210 generates packets to be transmitted to other nodes, and decodes received packets. Other than packets communicating normal application data, of special interest are routing packets. The routing packets include a route request packet 221, a route reply packet 222, an acknowledgement packet 223, an error packet 224, and a discovery packet 225. Nodes can also generate data packets 226. The processor also generates a header for each packet that is routed through the network.

The memory 220 stores a routing table (T) 300 generated from the communicated packets, and a list of discovery packet sequence numbers (SN) 225, described in greater detail below.

Routing Table

Figure 3:
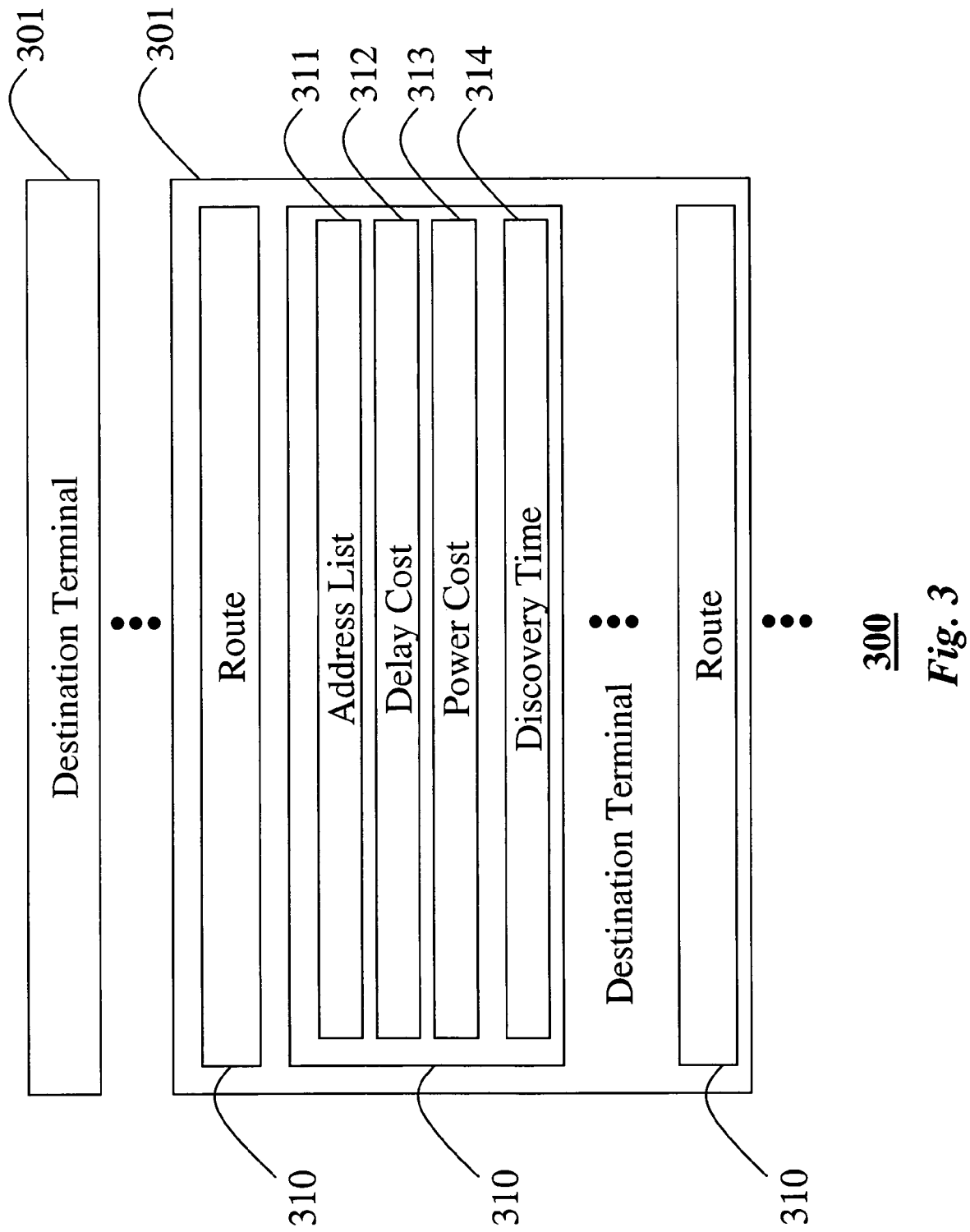
FIG. 3 is a block diagram of a routing table used by the invention.

FIG. 3 shows the routing table 300 in greater detail. The table 300 includes one entry 301 for each destination node. For each destination node, there are one or more routes 310. Each route 310 includes an ordered list of intermediate node addresses 311 of nodes along the route, a delay cost 312, a power cost 313, and a discovery time 314. The delay cost is the end-to-end delay experienced on the route to the destination node. The power cost reflects the total residual power of all intermediate nodes on the route. The discovery time indicates when a route to a destination node was discovered. These are described in greater detail below.

Route Discovery

Figure 4:
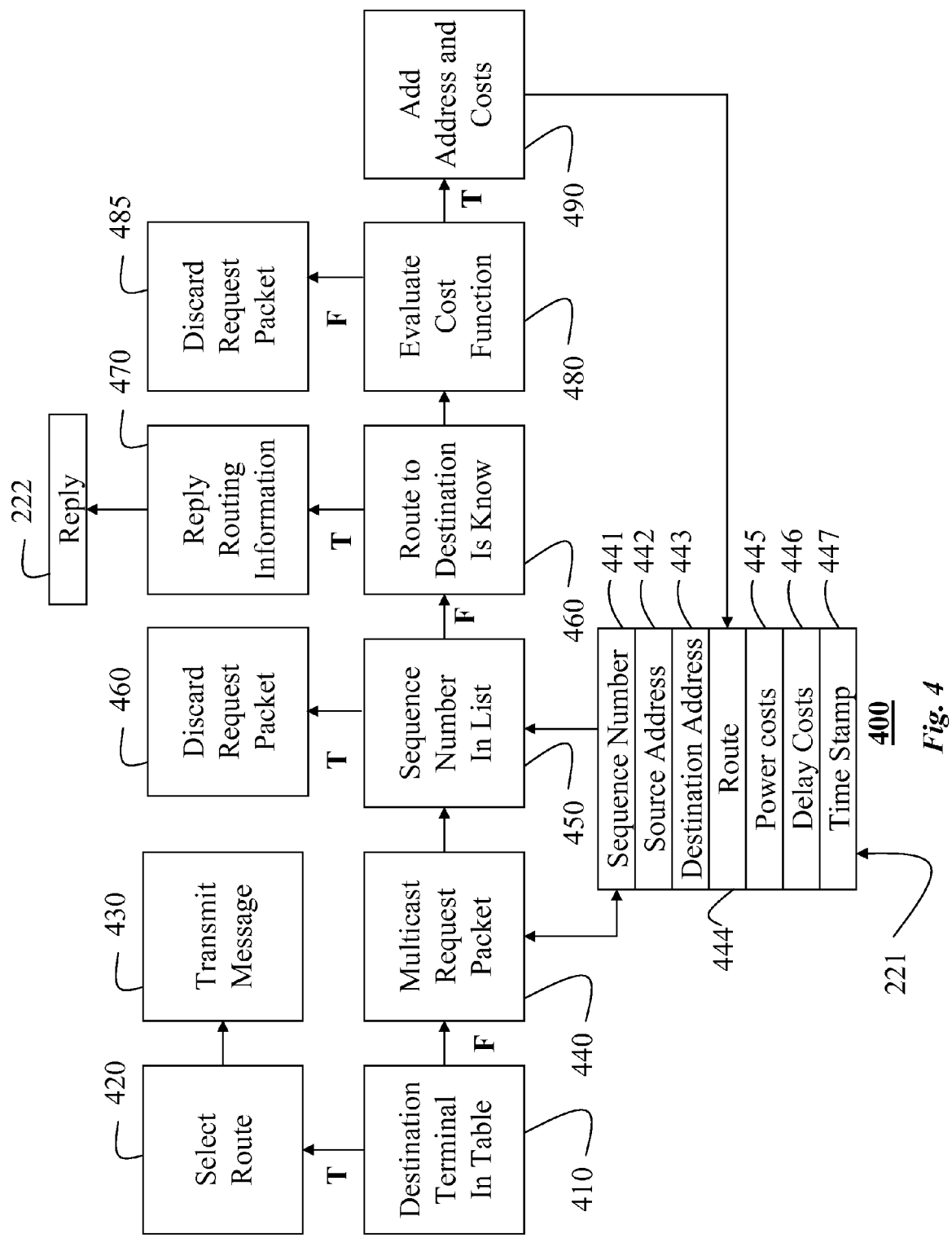
FIG. 4 is a block diagram of a method for discovering routes in the network of FIG. 1.

As shown in FIG. 4, a route discovery method 400 operates as follows. When a source node S needs to send a packet to a destination node with an address D, the node S first determines 410 whether the routing table 300 includes an entry for address D. If true, and there is an entry for node ID, then node S select 420 of the routes 311, and transmits 430 the packet. Optimal route selection is described in greater detail below.

Otherwise, if false, the node needs to discover a route to the destination node. To discover the route to the destination node, the source node broadcasts 440 the route request packet 221. The request packet 221 includes a sequence number 441 associated with the node, the source node address 442, the destination node address 443, an ordered list of intermediate node addresses, i.e., the 'route' 444, an ordered list of power costs 445, an ordered list of delay costs 446, and a time stamp 447 indicating the time that the packet 221 was generated.

Nodes that are within the radio range of node S receive the route request packet 221 and pass the packet to the processor 210. The processor decodes the sequence number, source node address, and the destination address in the route request packet 221.

The processor determines 450 whether the sequence number is stored in the list 225. If true, then the request packet is discarded 460. Otherwise, if false, then determine 460 if the routing table 300 includes a route to the destination node D.

If true, the intermediate node sends 470 the reply packet 222 back to the source node including the route information. The reply packet includes the route, i.e., addresses, from the source node to the intermediate node, as well as addresses from the intermediate node to the destination node. The route information also contains the delay cost and the power cost. That is, the reply packet essentially is an updated version of the request packet.

Otherwise, if false, the intermediate node evaluates 480 a cost function to determine whether the intermediate node should act as an intermediate node for the desired route. If false, the request packet is discarded 485. Otherwise, if true, the intermediate node adds 490 its 'intermediate' address, delay and power costs to the request packet, and rebroadcast 440 the packet. This process is repeated until the RREQ packet reaches the destination node.

At this point the destination node generates a reply packet and sends it to source node S. When the source node S receives the reply packet, a route to the destination node in known and the source node also knows the delay and power cost of each link along the route.

Power Costs

The power costs are used to maximize the lifetime of battery operated nodes. When an intermediate node receives the request packet, the node measures its local residual power in the battery 201. The residual power is converted to a power cost to decide whether it is cost effective for the node to act as an intermediate node in a desired route. The conversion of residual power to power cost is described in greater detail below.

If the power cost is less than a predefined threshold cost, then the intermediate node adds 490 its own address to the packet, otherwise the packet is discarded 485. The node also appends its local power cost and delay cost to the list 445, and broadcasts the packet to neighboring nodes. This is repeated until the request packet reached the destination node. Ultimately, a reply packet to the source node is generated.

When the source node S receives the reply packet 222, the source node compares the power cost associated with the newly discovered route to the costs of other available routes the source node may select for the same destination node.

The route with the least power cost can then be selected for transferring data packets 226.

The power cost of a route is derived from the residual power in the intermediate nodes. Of primary importance, is to ensure that the power in any node is sufficient to maintain its own operation.

To simplify the computation of the power cost in nodes and to reduce the size of the overhead used to represent power and delay cost, the invention quantizes the residual power to discrete levels to determine the power cost.

For example, if four levels are used, then:

Level 0 means very high residual power. The nodes can actively participate in forwarding data. The power cost in the header remains unchanged.

Level 1 means moderate residual power. The node can actively participate in forwarding data, but the power cost in the packet headers is increased to one.

Level 2 means low residual power. The node can participate in forwarding data, but the power cost is in the header is increased by two.

Level 3 means marginal residual power. The node does not participate in forming a route. In this case, the request packet is discarded.

In other words, for the lowest level, always participate and do not increase the power cost, for the highest level never participate, and for intermediate levels participate but increase the power cost of the route according to the quantized amount of residual power.

If the initial amount of power of the $n^{th}$ node is E joules, then the residual power in the node at time t is denoted by R(t) joules, and the quantized power cost for using $n^{th}$ node as an intermediate node is P(n).

Power Cost Function

One way to determine a local power level L(t) is with the following cost function:

if $R(t) \leq E^*\alpha$, then $L(t)=3$;

else if $E^*\alpha < R(t) \leq E^*\beta$, then $L(t)=2$;

else if $E^*\beta < R(t) \leq E^*\gamma$, then $L(t)=1$;

else $L(t)=0$.

Where $\alpha$, $\beta$ and $\gamma$ are numbers less than 1.0 and monotonically increasing; $\alpha < \beta < \gamma$.

After the local power cost has been determined, the power cost is added 490 to the packet header prior to forwarding the packet to the next node. That is, the power cost P(n), is updated as P(n)=L(t). The total power cost for a particular route is the sum of the power costs associated with the intermediate nodes that form the route.

Each node that receives a route request packet determines and forwards the power cost in the same manner. In this way, the source node receives an ordered list of nodes that constitute a route to the destination node and the power cost associated with each node along the route.

Delay Costs

If the data in the packets are delay sensitive, the intermediate node can also calculate the delay cost. The delay cost on a particular link of the route is determined from a difference between the current time and the time stored in the time stamp 447. This cost is also mapped into the same number of discrete levels as the power cost so that it may be represented with a limited number of bits. The total latency of a route is the sum of the individual delay costs in the route reply or acknowledgement received by the source.

Route Selection

If the destination node is in the routing table 300, then the source node selects normally a most recent route for sending data packets, i.e., the route with a most recent discovery time 314 and a minimum power cost 313. If the packet is time sensitive, e.g., sensor data or streaming data, then the route with the minimum delay cost 312 is selected.

It should be noted that these selection criteria can be combined in various orders.

When an intermediate node receives a request packet that includes its own address, the intermediate node updates the power and delay costs in the request packet 211 for its own address before forwarding the packet to the next node in the route list 444.

Acknowledgement

When the destination node D receives a data packet 226, the destination sends back the acknowledgement packet 223 to the source node. The acknowledgement packet is sent along the route in a reverse order of the intermediate nodes. This acknowledgement serves two purposes. The acknowledgement packet notifies the source node that a successful transmission has occurred. Now, the source node can discard the transmitted packet, as the packet does not have to be retransmitted.

The acknowledgement packet also includes updated cost values for each link along the route. Thus, the source and intermediate nodes can update their own routing tables from any acknowledgement packets traveling back along the route to the source node.

Upon receipt of the acknowledgement packet, the source node can update the routing table 300, and the discovery time 314 can be set to the current time.

If the acknowledgement packet is not received, the source node can retransmit the packet until an acknowledgement packet is received. If a preset time threshold is exceeded and no acknowledgement is received, then it is assumed that the route is no longer available. In this case, the source node can delete the route from the table 300, and select a different route. If a different route is not available, then a new route to the destination can be discovered.

It should be noted, that any intermediate node can discover a 'broken' route. In this case, the intermediated node can send a route error packet 224 back to the source node. The route error packet informs the source node that the route is broken and eliminates the need for any further retransmission attempts by the source node.

Routing Maintenance

Route maintenance is on-demand and occurs during normal usage of the routes. When a source node sends a packet along a selected route, each intermediate node performs the power and delay calculations as described above. If the new costs values are different, then the old costs are replaced by the new costs.

When a node exits the network, some routes will no longer be available. These routes are deleted from the table 300, and if necessary alternative routes are discovered.

When a node enters the network it can notify the coordinator node 110. Then, the coordinator node 110 can broadcast a discovery packet 225 for all nodes to perform route discovery, as described above.

Although the preferred embodiment of the invention is described via an example using DSR as the underlying route discovery process, other ad-hoc routing algorithms, such as ad-hoc on-demand distance vector routing (AODV), can also use the same cost function to determine optimal routes and the use of DSR is not a requirement for the operation of the proposed invention.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for maximizing residual power along routes in a wireless network including a plurality of battery operated nodes, comprising:
   discovering a plurality of routes from a destination node to a source node via intermediate nodes of the network using dynamic source routing (DSR);
   measuring a residual power in the battery of each intermediate node;
   determining a power cost associated with each route according to the residual power of the intermediate nodes;
   selecting a particular route for transferring data from the source node to the destination node, the particular route having a least power cost;
   including the particular route in a routing table in a packet, in which the routing table is an ordered list of intermediate node addresses;
   determining a delay cost associated with each route;
   selecting a particular route having a least delay cost; and
   including the least delay cost in each transmitted packet; and
   transmitting each packet in the network using the DSR, and in which each packet includes the routing table.

2. The method of claim 1, further comprising:
   associating a time of discovery with each route;
   selecting the particular route having a most recent time of discovery; and
   including a time stamp indicating the time that the particular route was discovered in the routing table in each transmitted packet.

3. The method of claim 1, in which the network is ad-hoc.

4. The method of claim 1, further comprising:
   storing a routing table in each node.

5. The method of claim 1, further comprising:
   quantizing the residual power to a power level to determine the power cost.

6. The method of claim 5, further comprising:
   participating in the route if the power level is a least power level;
   not participating in the route if the power level is a highest level; and
   participating in the route if the power level is an intermediate power level, and increasing the power cost according to the power level.

7. The method of claim 5, in which an initial power of an $n^{th}$ node is E joules, and the residual power in the $n^{th}$ node at time t is R(t) joules, and the power cost for using $n^{th}$ node as an intermediate node is P(n), and the power level L(t) of the $n^{th}$ is determined by $$\text{if } R(t) \leq E^*\alpha, \text{ then } L(t)=3;$$

$$\text{else if } E^*\alpha < R(t) \leq E^*\beta, \text{ then } L(t)=2;$$

$$\text{else if } E^*\beta < R(t) \leq E^*\gamma, \text{ then } L(t)=1;$$

$$\text{else } L(t)=0/$$

where $\alpha, \beta,$ and $\gamma$ are numbers less than 1.0 and monotonically increasing according to $\alpha < \beta < \gamma$.

8. The method of claim 1, in which the discovering uses ad-hoc on-demand distance vector routing, and includes the routing table in each transmitted packet.

9. A method for maximizing residual power along routes in a wireless network including a plurality of nodes, each node having an address and a battery, comprising:
   broadcasting a request packet, the request packet including the address of a source node and the address of a destination address using dynamic source routing (DSR);
   receiving the request packet in an intermediate node;
   measuring a residual power in the battery of the intermediate node;
   determining a power cost associated with each route according to the residual power of the intermediate nodes;
   sending a reply packet to the source node, the reply packet including the address of the intermediate node and the power cost;
   determining a delay cost associated with each route;
   selecting a particular route having a least delay cost;
   including the least delay cost in each transmitted packet; and
   repeating the broadcasting, receiving, measuring, determining and the sending until the request packet reaches the destination node;
   constructing a route in a routing table in the source node from the reply packets, the route having the associated power cost;

selecting a particular route for transferring a data packet from the source node to the destination node, the particular route having a least power cost;

including the particular route in a routing table in a packet, in which the routing table is an ordered list of intermediate node addresses; and transmitting each packet in the network using the DSR, and in which each packet includes the routing table.

10. A wireless network including a plurality of battery operated nodes, comprising:

means for discovering a plurality of routes from a destination node to a source node via intermediate nodes of the network using dynamic source routing;

means for measuring a residual power in the battery of each intermediate node;

means for determining a power cost associated with each route according to the residual power of the intermediate nodes; and means for selecting a particular route for transferring data from the source node to the destination node, the particular route having a least power cost, in which the particular route is included in a routing table in a packet, in which the routing table is an ordered list of intermediate node addresses;

determining a delay cost associated with each route;

selecting a particular route having a least delay cost;

including the least delay cost in each transmitted packet and each packet in the network using the dynamic source routing, and in which each packet includes the routing table.

11. The method of claim 1, in which the routing table includes a delay cost and the power cost of the route.

12. The method of claim 1, further comprising:

updating the routing table in each packet when the packet is transmitted.

13. The method of claim 1, further comprising:

including, in each packets, an amount of residual power in each node along the particular route.

* * * * *